(No Model.)  H. LACASSE & S. WILE.  10 Sheets—Sheet 4.
FEED APPARATUS OR CARRIER.

No. 443,098.  Patented Dec. 23, 1890.

WITNESSES:  INVENTORS
  Henry LaCasse
  Sol Wile
BY
  George W. Hey
  ATTORNEY (No Model.)

H. LACASSE & S. WILE.
FEED APPARATUS OR CARRIER.

No. 443,098. Patented Dec. 23, 1890.

Fig. 5.

WITNESSES:

INVENTORS

BY

ATTORNEY (No Model.) 10 Sheets—Sheet 6.

H. LACASSE & S. WILE.
FEED APPARATUS OR CARRIER.

No. 443,098. Patented Dec. 23, 1890.

WITNESSES:
INVENTORS
BY
ATTORNEY.

(No Model.) 10 Sheets—Sheet 8.

H. LACASSE & S. WILE.
FEED APPARATUS OR CARRIER.

No. 443,098. Patented Dec. 23, 1890.

WITNESSES:

INVENTORS
Henry LaCasse & Sol Wile
BY George W. Hey
ATTORNEY

(No Model.)

H. LACASSE & S. WILE.
FEED APPARATUS OR CARRIER.

Patented Dec. 23, 1890.

(No Model.)　　　　H. LACASSE & S. WILE.　　10 Sheets—Sheet 10.
FEED APPARATUS OR CARRIER.

No. 443,098.　　　　　　　　　　Patented Dec. 23, 1890.

WITNESSES:　　　　　　　　　　　　　　　INVENTORS
　　　　　　　　　　　　　　　　　Henry LaCasse & Sol Wile
　　　　　　　　　　　　　　　　　BY
　　　　　　　　　　　　　　　　　George W. Hey
　　　　　　　　　　　　　　　　　ATTORNEY

UNITED STATES PATENT OFFICE.

HENRY LA CASSE AND SOL. WILE, OF ROCHESTER, NEW YORK, ASSIGNORS TO THE BOTTLERS' SPECIALTY COMPANY, OF SAME PLACE.

FEED APPARATUS OR CARRIER.

SPECIFICATION forming part of Letters Patent No. 443,098, dated December 23, 1890.

Application filed November 5, 1889. Serial No. 329,351. (No model.)

*To all whom it may concern:*

Be it known that we, HENRY LA CASSE and SOL. WILE, of Rochester, in the county of Monroe, in the State of New York, have invented new and useful Improvements in Carriers, of which the following, taken in connection with the accompanying drawings, is a full, clear, and exact description.

Our invention relates to an improved feed or carrier, and has for its object the production of a simple and effective device which will readily feed the desired article to its required position; and to this end it consists, essentially, in impinging faces or jaws for engaging the article to be fed, a sliding block or wedge operatively connected to said faces, whereby they are forced toward or away from each other, according to the advance and return movement of said block or wedge, an auxiliary support or holder for aiding said faces or jaws, and a gage for bringing the said article to the desired plane in relation to said impinging faces.

Our invention also consists in novel actuating mechanism and in the detail, construction, and arrangement of the parts, all as hereinafter more particularly described, and set forth in the claims.

In describing our invention reference is had to the accompanying drawings, forming a part thereof, in which like letters indicate corresponding parts in all the views.

Our improved carrier is here shown as operatively supported upon the frame A of our improved machine for "corking bottles and wiring the corks thereto," for which we have filed an application for patent, Serial No. 319,355. It will be understood, however, that this carrier may be connected to any desirable form of machine, and that we have only illustrated said frame and a portion of the actuating mechanism mounted thereon in order that the operation of our feed or carrier may be more readily understood.

Supported in brackets or arms A', projecting from the frame A, is the rod B, which is preferably stationary, and upon which the various parts of our invention are supported, part of which are stationary and the remainder revoluble thereon.

The carrier-frame B' may be of any desirable form and construction, but is here illustrated as a pair of revoluble disks or plates, between which are pivoted the carrier-arms, also of desirable form and construction. As illustrated, these carrier-arms consist of levers C, pivoted at $c$ to the upper disk B' and provided at their outward free extremity with impinging faces D. These impinging faces are preferably removably secured to the extremities of the carrier-arms, and this desirable result we produce by providing said extremities with a guide C', which is preferably dovetailed, and by forming upon said impinging faces the tongue D' for engaging said guide. At the top of the tongue D' is a projection or lip d, which engages the top face of the arm C and limits the downward movement of the impinging faces. In order to render positive the action of said faces D, we prefer to provide the same with the yielding facing D², preferably formed of rubber or other material, which, if desired, may be corrugated or otherwise roughened upon its engaging surface.

Figure 8:
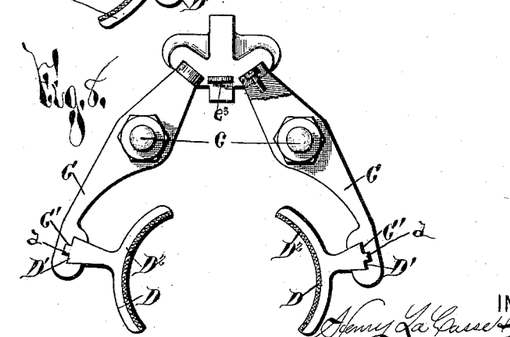
Fig. 8 is a detail view of a pair of said carrier-arms and their actuating sliding block or wedge.
Figures 9, 10:
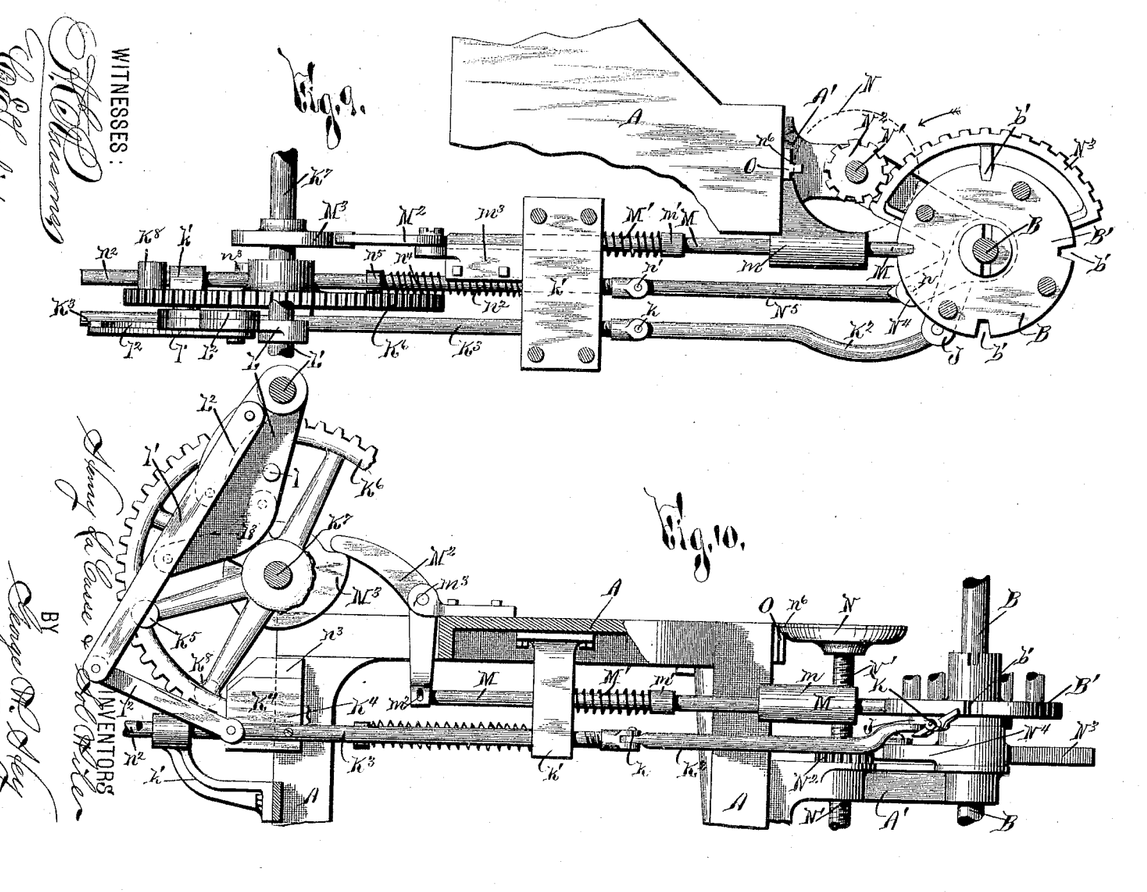
Fig. 9 is a detail view illustrating in plan the mechanism for intermittently revolving the carrier and locking the same in its desired position.
Fig. 10 is an elevation of the parts as illustrated in plan in Fig. 9.
Figure 11:
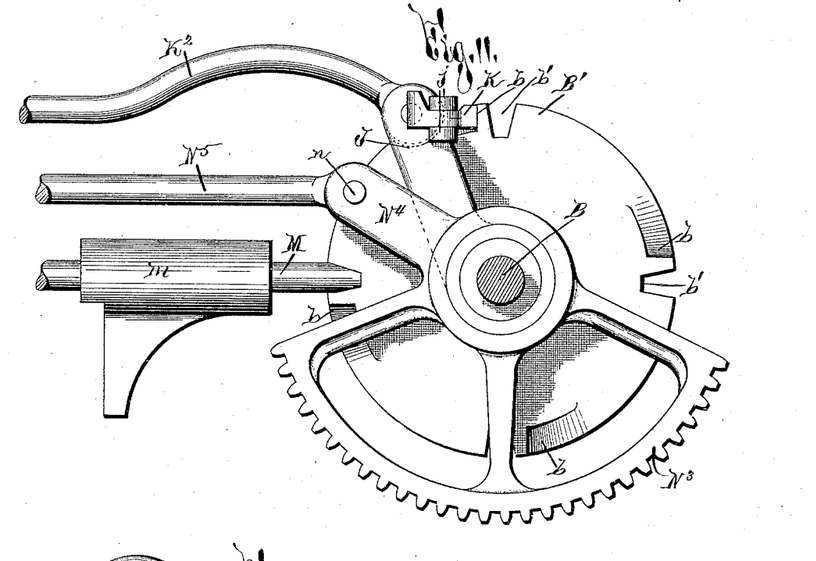
Fig. 11 is an enlarged inverted plan of a portion of the actuating mechanism and the lock for the carrier.
Figures 12, 13:
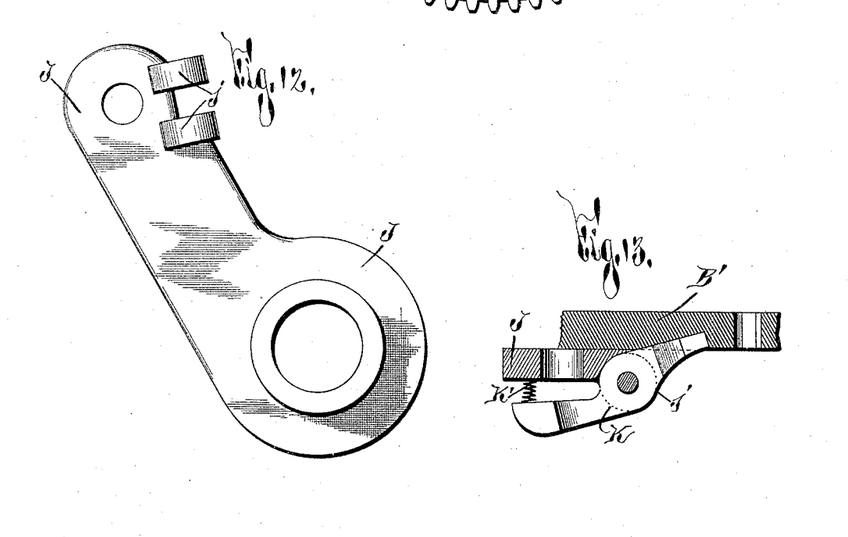
Figs. 12 and 13 are detail views of the rocking lever and its ratchet-dog, as shown in Fig. 11.

The adjustment of the carrier-arms to different-sized articles is preferably produced by providing additional sets of impinging faces, one of which is illustrated in Fig. 8. The additional faces are provided with a like lug or tongue D', guided in the groove or guide C' of the carrier-arms C; but it will be understood that the said tongue or groove projects a greater distance from the impinging faces, and consequently brings them closer together when operatively mounted.

Figure 2:
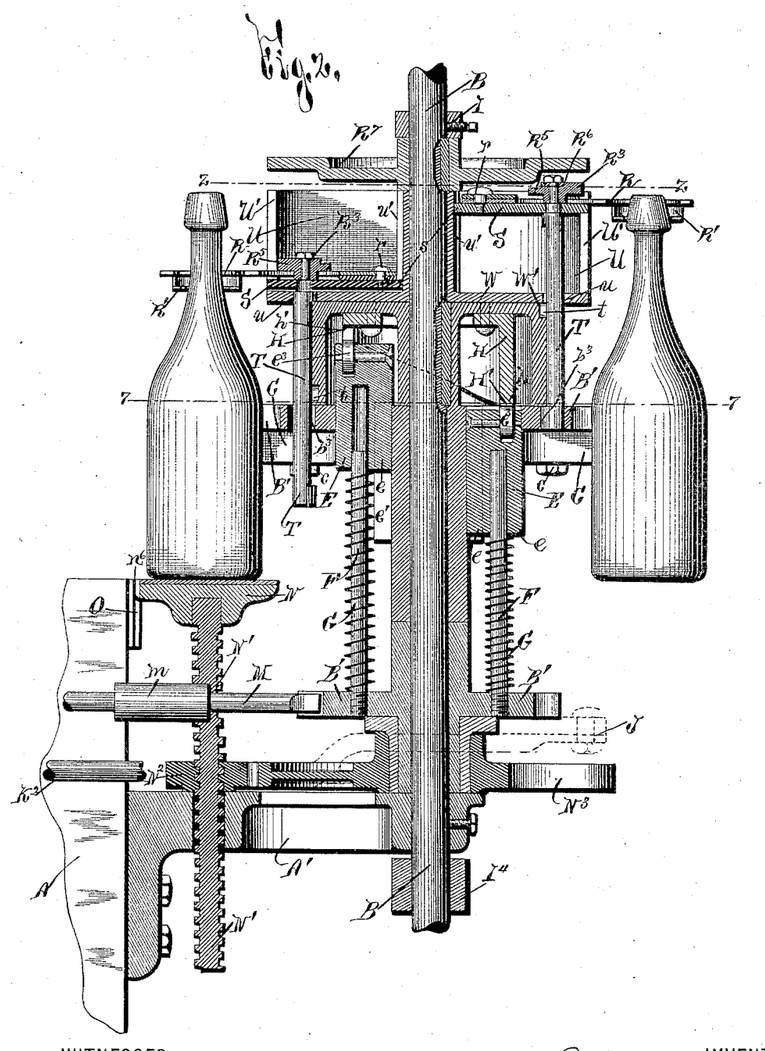
Fig. 2 is a vertical section taken on line $x\ x$, Fig. 1.
Figure 3:
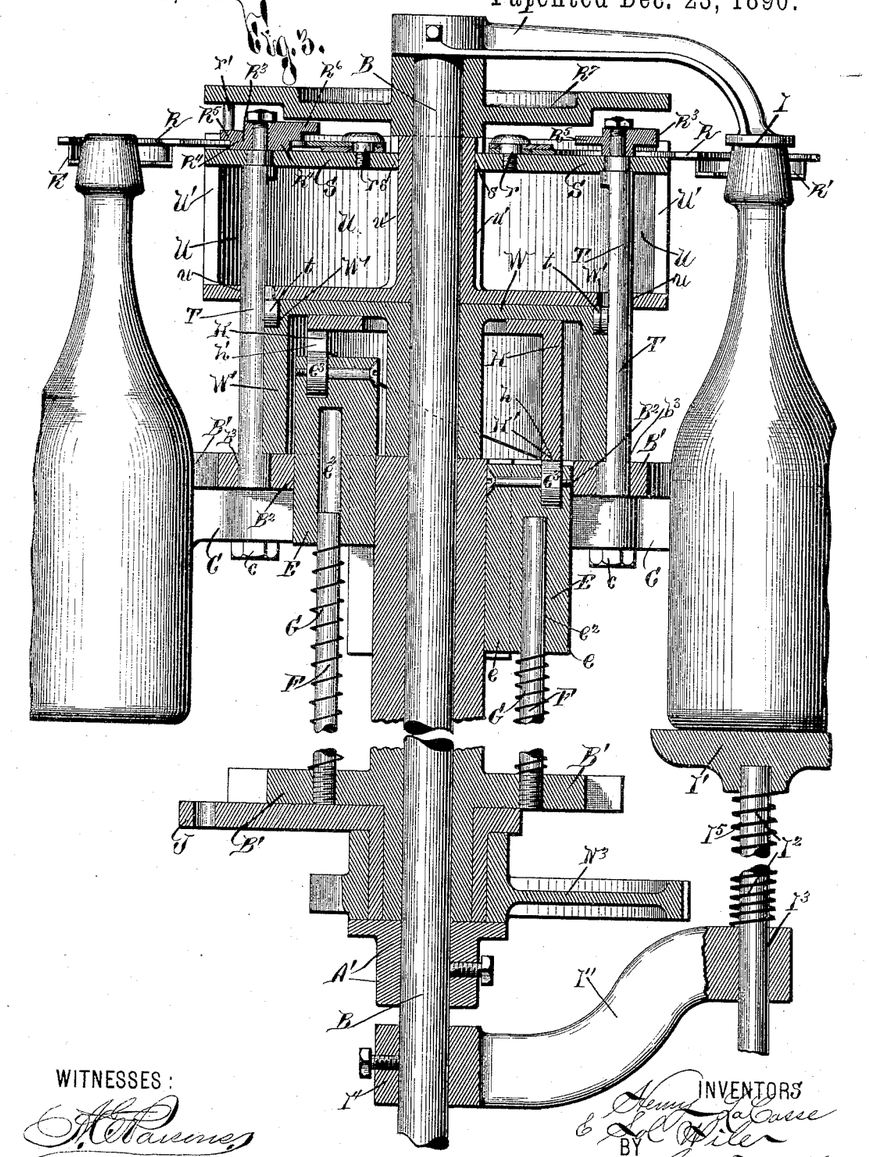
Fig. 3 is a like section, slightly enlarged, taken on line $y\ y$, Fig. 1.
Figure 16:
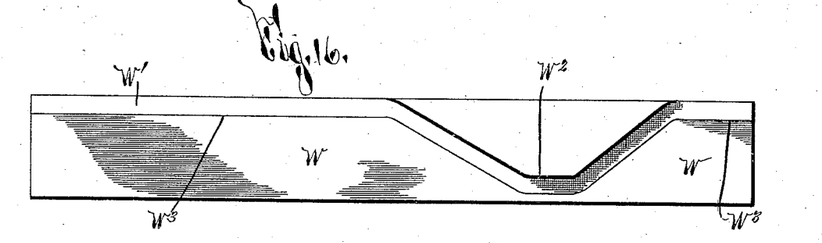
Fig. 16 is a developed elevation of the cam for raising and lowering the auxiliary holders of the carrier.
Figure 17:
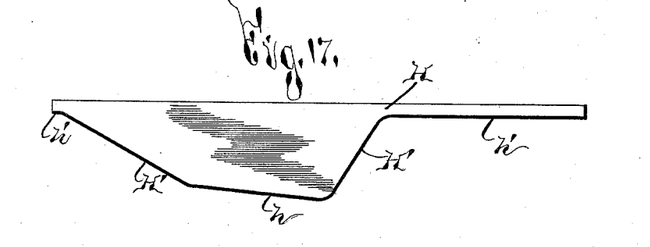
Fig. 17 is a developed elevation of the cam for raising and lowering the sliding block or wedge for actuating the carrier-arms.
Figures 18, 20:
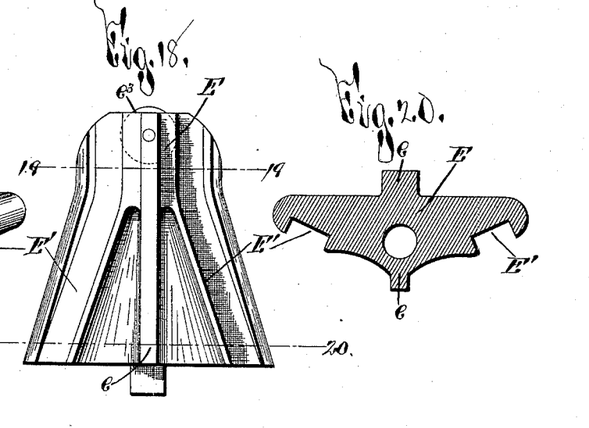
Fig. 18 is an enlarged elevation of the sliding block or wedge for operating the carrier-arms.
Figs. 19 and 20 are sectional views taken on the respective section-lines 19 19 and 20 20, Fig. 18.
Figure 19:
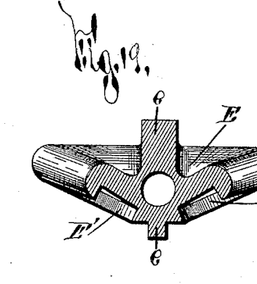

As so far described, the carrier-arms of our improved carrier are substantially the same as the arms illustrated in our pending application, Serial No. 318,932; but the operating mechanism is entirely different therefrom, as well as many other features of construction. As here illustrated, this operating mechanism consists of a sliding device or wedge having inclined surfaces or ways, whereby the movement of said device in one direction closes the carrier-arms and its movement in the opposite direction opens said arms. In order to bring about this result, said sliding block, as best illustrated in Fig. 16, is provided with ways E', inclined one from the other. Provided upon the carrier-arms are suitable projections engaging said grooves, and, as illustrated, these projections preferably consist of a roller secured to the extremity of said arms. Formed on either side of the said sliding block or wedge are guides or tongues e, which retain the same in its desired position and insure positive operation of the carrier-arms. It will be noticed by reference to Figs. 2, 3, and 7 that the said sliding block slides or reciprocates in a cut-out B², provided in the disk B', and that this cut-out is large enough to receive the enlarged extremity of said block. It will also be noticed that the guides e' provided in the sides of said opening B² are parallel, since the guides e of said block must also be parallel in order to secure the best result.

Experience has demonstrated that the mechanism for actuating the carrier-arms should be of such a character as to conform to the inequalities in the size of the objects to be fed, since it is seldom that all are of the same size. This is particularly the case in feeding bottles, for which our machine is especially designed. This desirable effect we accomplish by utilizing spring-pressure to operate the sliding block E when closing the carrier-arms.

Mounted in the lower disk B' is a guide F, which, if desired, may consist of a round rod guided in a way $e^2$, formed in the lower part of the said block E. A spring G constantly forces said block upward with a steady pressure, and when by said upward movement the carrier-arms have been forced together against the fed article the closing of said arm is checked without any jar, since said actuating force is a spring. The mechanism for forcing backward said block and opening the carrier-arms preferably consists of a cam H, having the cam-face H', provided with the tooth h, for forcing downward said sliding block, and the cut-out h', for allowing the operation of the spring G.

In order to reduce the friction upon the parts, we mount in the upper part of the block E the roller $e^3$, which bears against the actuating-face H' of said cam. It will thus be understood that the carrier-arms are operated to grasp the fed article without any liability of fracturing the same and that at the proper time the said arms are operated to release the said article.

Before being grasped by the carrier-arms the article to be fed is contacted with a suitable gage, which is here shown as rigidly mounted upon the rod B. Directly beneath this gage I is a support I', which is preferably yielding in order that the same may adjust itself to the different lengths of articles. This support I' is mounted upon a rod I², guided in a way I³, formed in a bracket I⁴, secured upon the rod B. A spring I⁵ is interposed between the said support I' or a shoulder upon the rod I² and the top face of the guide I³. It will thus be understood that the said support enables the article to be brought to the desired plane by means of the gage I, and when in this position the carrier-arms are open, and are then actuated by the block E to grasp said adjusted article and feed the same, as described.

As previously mentioned, the carrier-arms and their supporting-frame are revoluble upon the rod B by means of suitable actuating mechanism, which we will now proceed to describe.

As best seen in Figs. 2, 3, 9, and 10, the lower disk of the carrier-frame is provided with an upwardly-extending hub locked, preferably, by a clutch-face to the downwardly-extending hub of the upper disk B'. Mounted adjacent to said lower disk or plate, and also loose upon the rod B, is the lever J, having the ratchet-dog K, which engages notches b provided in said disk. As illustrated, this dog is hinged to depending lugs j, provided upon said lever J, and engages the underneath face of said disk. This engagement is partially brought about by weighting the free extremity of said dog, so that the weight thereof constantly forces upward the engaging extremity and is re-enforced by a spring K' interposed between the dog and the disk B'.

Pivoted to the free extremity of the lever J is the connecting-rod K², hinged at k to the sliding-rod K³, guided in the brackets k', supported by the frame A. Formed or provided upon this rod $K^2$ is the projection or lug $K^4$, with which is engaged a suitable cam $K^5$, here illustrated as a roller provided upon one of the operating-gears of our improved machine hereinbefore mentioned for corking bottles and wiring the corks thereto. As this gear $K^6$ revolves, the roller $K^5$ contacts with said lug $K^4$ and forces forward the rod $K^3$, and the rod $K^2$ is then actuated to engage the lower disk B′ with the dog K and revolve the same a certain distance around the rod B. It will be understood that these parts are relatively arranged in accordance with the distance from the gage I to the mechanism for operating upon the article to be fed in order that at one operation the bottle may be fed from the gage to said operating mechanism.

To retract the carrier-rotating mechanism we provide the lever L, hinged to a suitable support L′ and provided with a cam-face $L^2$, engaged by a suitable cam, which, if desired, may be the same cam $K^5$ that has previously forced forward the lug $K^3$. Provided upon this lever L is a pin $l$, which engages a link $l'$, connected by a link $l^2$ to the said lug or projection $K^4$. In order to reset this lever L without affecting the position of the said projection $K^4$, the link $l'$ is loose upon said lever, and the same is actuated forward only by the contact of the pin $l$, which does not engage said link upon the backward movement of the lever L.

Provided on the lever L is the cam-face $L^3$, which immediately after its disengagement from the face $L^2$ is engaged by the roller $K^5$. It will thus be seen that both the forward and rearward movement of the carrier is a positive movement, the former being brought about by the cam $K^5$ and the latter by the lever L. After being partially rotated, as described, the carrier is preferably locked in said position by means of any suitable locking device, here illustrated as a sliding rod M, guided in a bracket $m$, secured to the frame A. The said rod is also guided in one of the brackets $k'$, and interposed between said bracket and a shoulder $m'$, formed upon the rod, is a spring M′, which constantly forces the lock M against the periphery of the lower disk B′ and engages the same with the notches $b'$ provided in its periphery. Just before the operation of the carrier-actuating mechanism, as described, this lock is retracted from engagement with the disk B′ by means of suitable mechanism. As illustrated, this mechanism consists of a bell-crank lever $M^2$, hinged at $m^2$ to the rod M and pivoted to a bracket $m^3$, mounted upon the table A. The opposite arm of said lever is projected rearwardly and is forced upward by means of a suitable cam $M^3$, which is preferably mounted upon the shaft $K^7$ of the operating-gear $K^6$.

In order to prevent the discharge of the fed article from the carrier-arms when any desired operation is performed upon the same which would tend to that effect, we provide a suitable support N, which is preferably adjustable toward and away from the base of said article. In our feed or carrier we prefer to render this support automatically adjustable, so that the same is slightly lowered before the registration of the fed article and is then automatically raised to contact with the same. The said support and mechanism for rotating the same is substantially the same as that described in our aforesaid pending application for a feed or carrier; but we will now proceed to describe the same in order to clearly set forth the operation of our improved feed or carrier.

The support N is loosely mounted on the top of a screw-threaded spindle N′, guided in the bracket A′. Bearing on the top face or a suitable shoulder of said bracket A′ is a gear or nut $N^2$, having a central threaded opening, which engages the threads of the said spindle N′ and raises or lowers the same, according to the direction of said nut or gear. Engaging with said nut $N^2$ is the segment $N^3$, loosely mounted upon the rod B and provided with an arm $N^4$, hinged at $n$ to a connecting-rod $N^5$, hinged at $n'$ to a sliding rod $n^2$. Formed or provided upon this rod $n^2$ is a lug $n^3$, which, just before or at the same time as the operation of the carrier-acuating mechanism, is operated forward by a cam or roller $K^8$, also formed or provided on the gear $K^6$, and forces the segment $N^3$ in the direction indicated by the arrow at Fig. 9, whereupon the arrangement of the screw-threads upon the nut $N^2$ and the spindle N′ is such as to bring downward the support N. Immediately after the disengagement of the cam $K^8$ and the lug $n^3$ the segment $N^3$ is retracted by means of a spring $n^4$, interposed between a shoulder $n^5$, formed upon the rod $n'$, and one of the brackets $k'$, through which said rod is guided. It will thus be understood that while the downward movement of said support is positive the upward movement thereof is effected by means of a spring, and consequently, as in the operation of the carrier-arms, we absolutely prevent fracture of the fed article. As preferably constructed, the support N is loose upon its screw-threaded spindle and is not revoluble.

Figure 14:
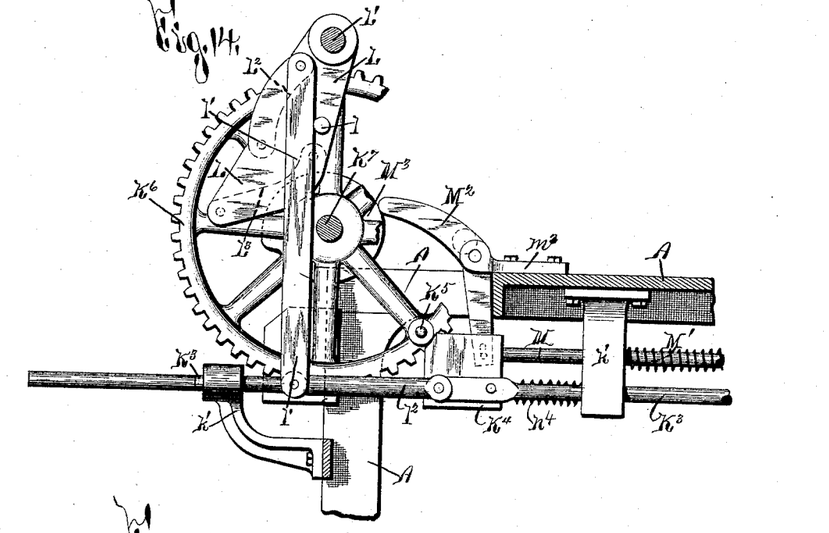
Fig. 14 is a detached detail of a portion of the actuating mechanism, illustrated as just having partially rotated the carrier.
Figure 15:
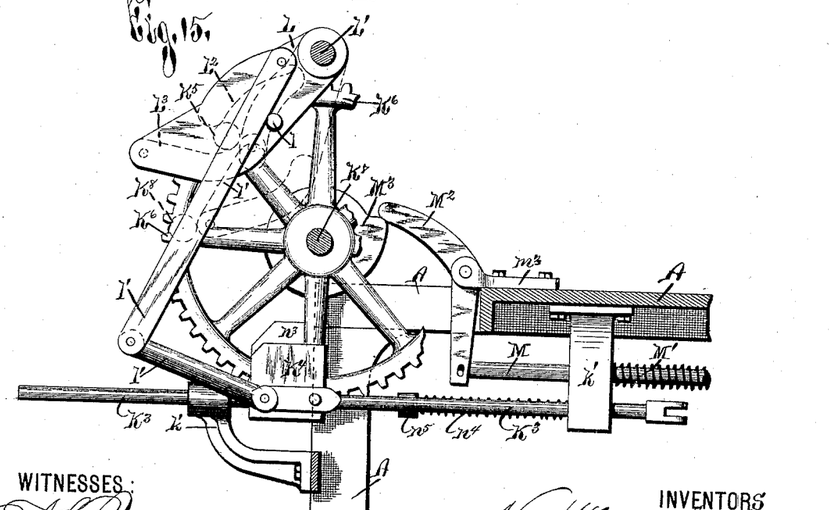
Fig. 15 is a like view to Fig. 14, illustrating the parts thereof as in a different position.

In order to guide the support in its upward and downward movement, we form the same with a suitable way $n^6$, engaged with a suitable guide O, mounted upon the frame A. The fed article, which preferably projects beyond the carrier-arms, is additionally supported by means of levers R, which, in addition to said function, also serve to lift upward the projecting extremities of the wire secured to the bottle by our improved machine hereinbefore referred to. When the bottle or other article to be fed is registered with the gage I and the yielding support I′, the levers R are preferably open in order to allow of this ready engagement, and after the commencement of the feed of the article said levers are then approximated toward the carrier-arms the required distance below the top of the fed article to allow of the desired operation thereupon. At the proper time, which in our improved wiring-machine aforesaid is after the securing of strands of wire to the bottle with their extremities projecting therefrom, the levers R are then raised upward and are brought together to support the fed article. These levers R are arranged in pairs at intervals corresponding to the location of the carrier-arms C, and are preferably pivoted at $r$ to a support S, raised upward and downward and preferably mounted upon the rod T, guided through openings $u$ in a disk U, provided with ways U', for allowing the upward and downward movement of said supports S. In order to guide the support S in its upward and downward movement, we provide thereon a suitable projection $s$, which is mounted in ways $u'$, formed upon the hub of said disk U. The lower extremity of the rod T is preferably guided through ways $b^3$ provided in the upper plate B', and is provided with a projecting lug $t$, riding in a groove W' of an actuating-cam W. (Best shown in Fig. 14.) After the engagement of the carrier-arms with the article to be fed the tooth $W^2$ of the cam W forces downward said rod T and brings the open levers R downward below the top of the said article to support the same, as previously stated.

Figure 4:
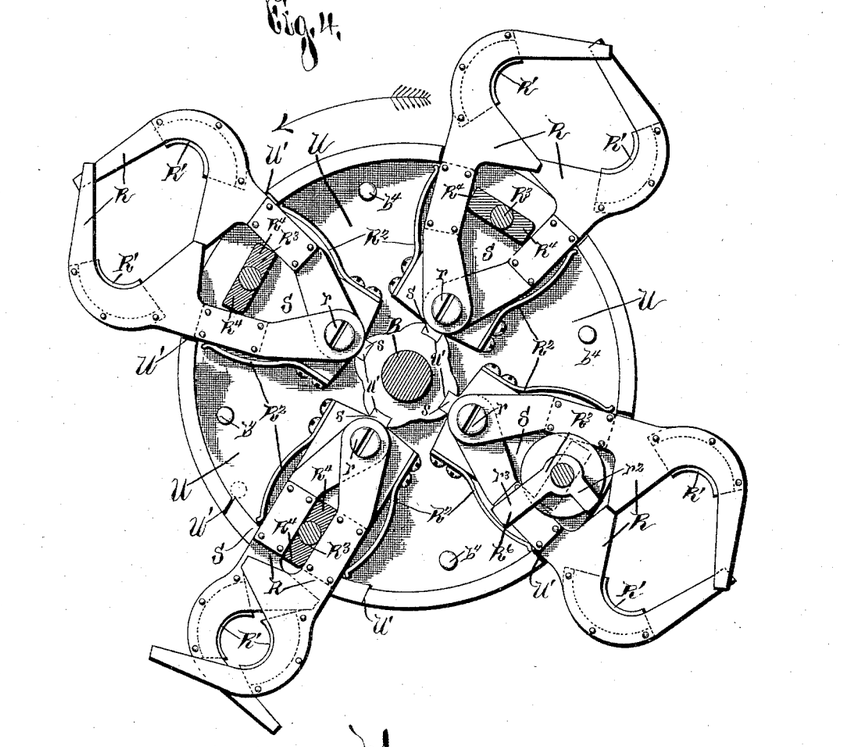
Fig. 4 is a horizontal section taken on line $z\ z$, Fig. 2.
Figure 7:
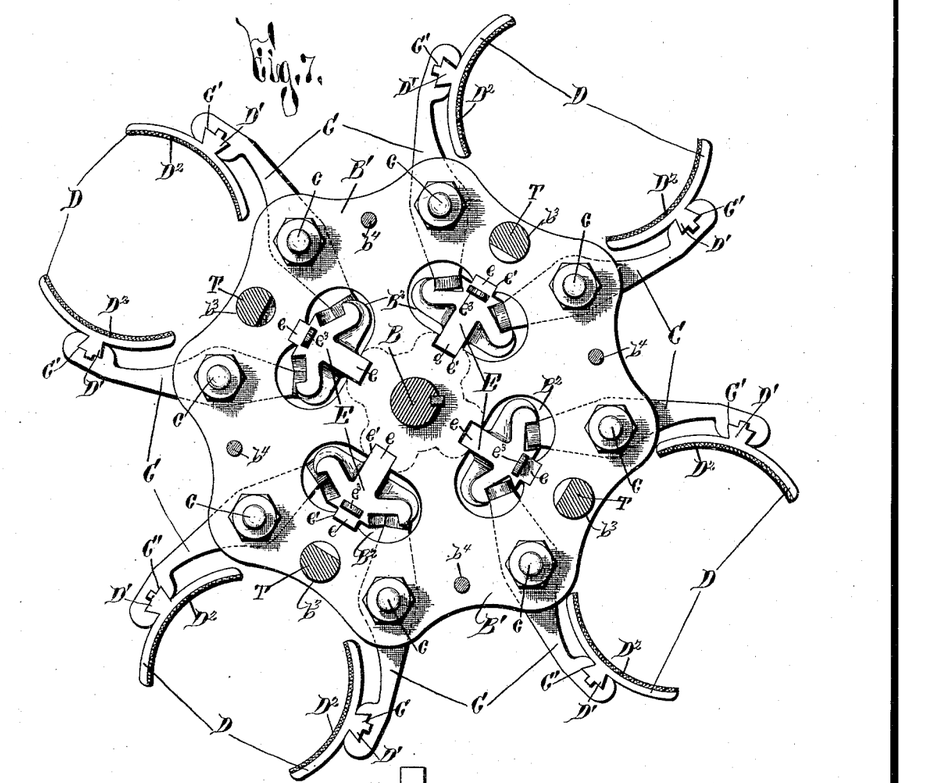
Fig. 7 is a horizontal sectional view taken on line 7 7, Fig. 2, illustrating the relative construction and arrangement of the carrier-arms.

The revolution of the disk U is accomplished by connecting the same with the upper plate B' of the carrier-frame by means of rods $b^4$, as illustrated in Figs. 4 and 7.

Figure 1:
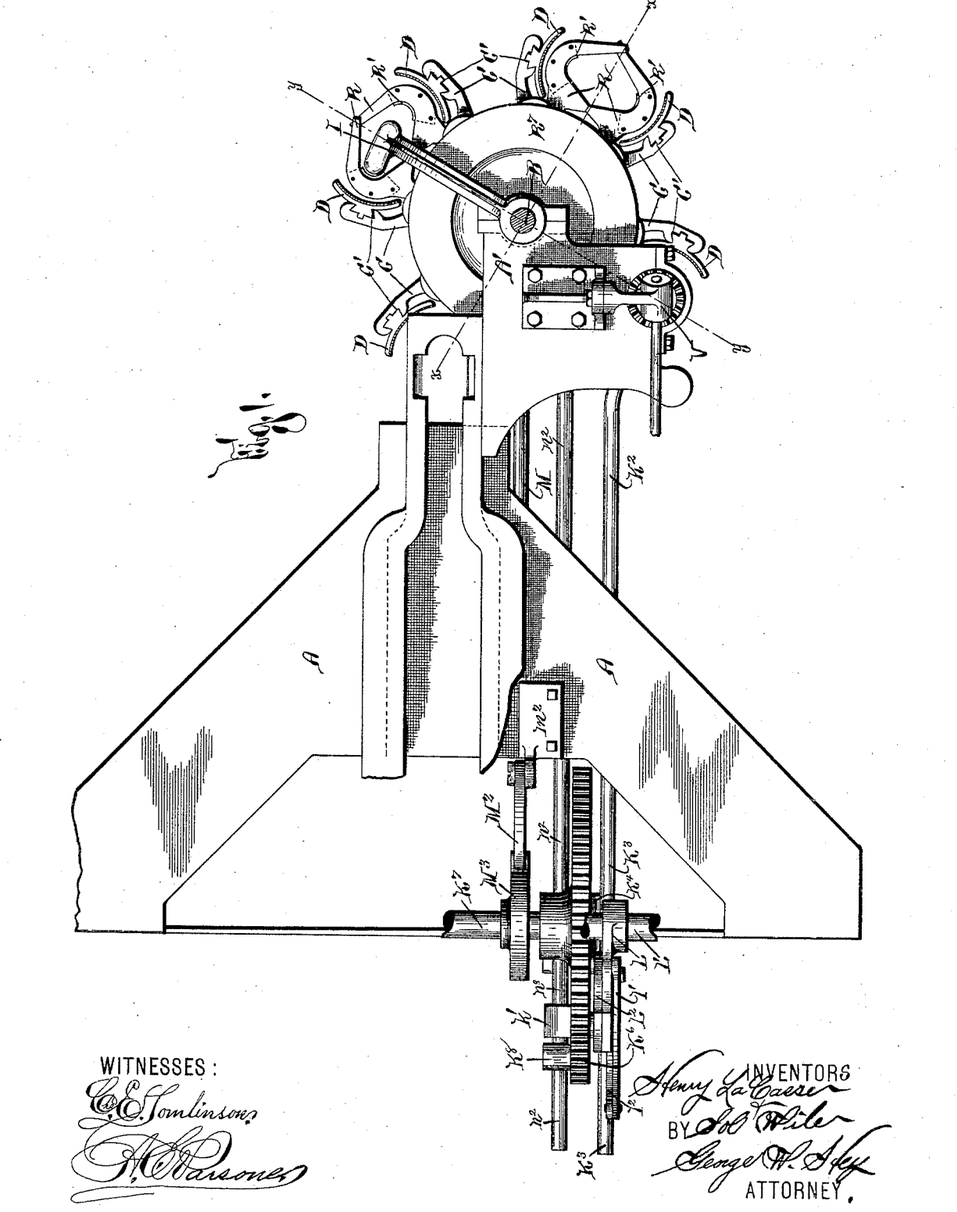
Figure 1 is a plan view of our improved carrier mounted in operative position upon a machine for corking bottles and wiring the corks thereto.

In our improved machine hereinbefore mentioned the carrier moves the bottle to the twisting mechanism, (illustrated at V in the plan view, Fig. 1,) and before the registration of the bottle therewith wiring mechanism (not illustrated) secures strands of wire thereto with their extremities projecting. Immediately after the securing of this wire the levers R are forced upward by the tooth $W^3$ of the cam W, and the projecting extremities of the wire are elevated upward, and are then gathered together over the top of the cork by means of the closing mechanism for said levers.

Formed upon the levers R, and preferably depending therefrom, are the yielding faces R', formed of rubber or other suitable material, which tightly impinge the wire against the bottle during the final twisting thereof at the top of the bottle, and thus insure more perfect work and prevent the strands being drawn from their desired position at the side of the bottle-head. While our carrier is not limited to this last function, it will be understood that in the preferable construction thereof it is very desirable and greatly facilitates the operation of the twisting mechanism. Immediately after the operation of the twisting mechanism the said levers R are then separated by mechanism which we will now proceed to describe.

Figure 5:
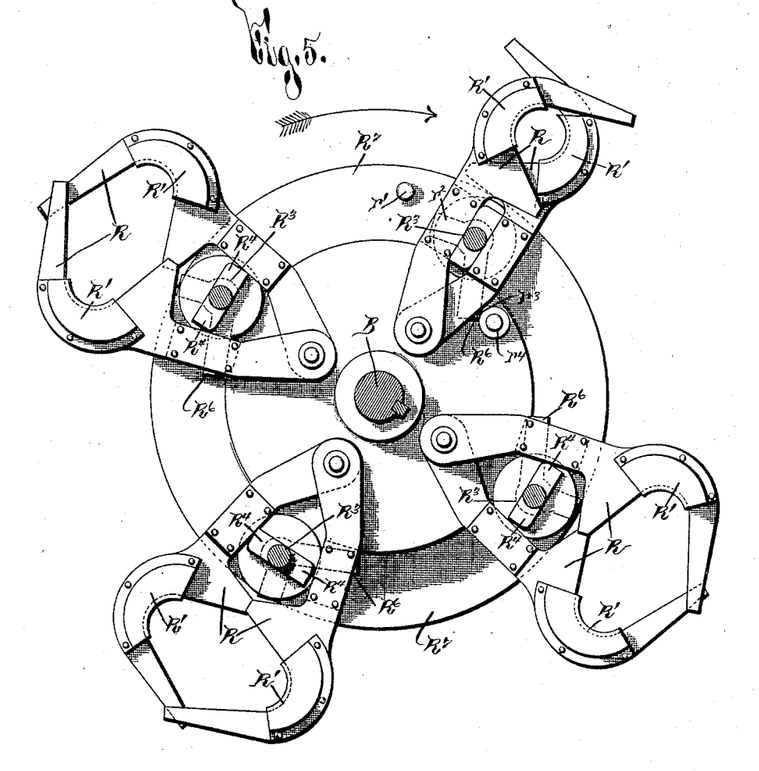
Fig. 5 is an inverted plan view of the parts illustrated in Fig. 4.
Figure 6:
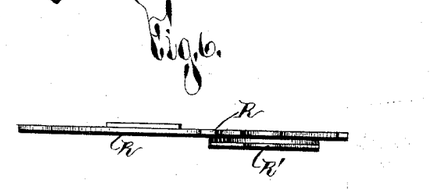
Fig. 6 is a detail view of one of the arms illustrated in plan in Fig. 5.

As previously set forth, the carrier-arms are pivoted at $r$ to the support S, and secured to said support are springs $R^2$, which bear against the opposite edges of said levers and constantly tend to approximate them together. The mechanism for opening said levers against the operation of said springs $R^2$ consists of the cam $R^3$, pivotally mounted upon either the support S or the rod T and provided on either side of its pivot with cam-teeth $R^4$, which bear against the adjacent faces of said levers and force them apart. This cam $R^3$ is provided with the disk-shaped portion $R^5$ in a plane above that of the cam-teeth $R^4$ in order to facilitate the opening and closing movement of said levers by providing a bearing therefor. Above the disk-shaped portion $R^5$ is the lever $R^6$, which is operated backward or forward to either open said arms R or else to turn the teeth out of engagement therewith and allow the operation of the spring $R^2$. Mounted above said arms and their actuating-cams $R^3$ is the disk $R^7$, having the projection $r'$, Fig. 5, for engaging one arm $r^2$ of the lever $R^6$ and swinging the cam-teeth $R^4$ so that they are parallel with the adjacent extremities of the levers R, thus allowing the said levers R to be closed by the springs $R^2$. Immediately after the contacting of said lever with said support $r'$ an arm $r^3$, provided upon said lever $R^6$, is then contacted with a second projection $r^4$, which swings backward the cam $R^3$ and opens the arms R, as illustrated in Fig. 4. If desired, these arms might be brought downward upon the top of the fed article to discharge the same, as in our previous feed or carrier application; but we do not limit ourselves to said operation.

The operation of our invention will be readily perceived from the foregoing, and it will be understood that we do not limit ourselves to the precise form and construction of the parts of our invention, since considerable change may be made in the relative construction and arrangement thereof without departing from the spirit of our invention.

Having thus fully described our invention, what we claim as new, and desire to secure by Letters Patent, is—

1. In a feed or carrier, the combination of impinging faces or jaws for grasping the article to be fed and a movable wedge for approximating said faces, substantially as and for the purpose specified.

2. In a feed or carrier, the combination of oscillating levers, impinging faces or jaws removably secured to said levers, and a movable wedge for approximating said faces, substantially as described.

3. In a feed or carrier, the combination of oscillating levers, a dovetail provided at one extremity of said levers, impinging faces or jaws guided in said dovetail, and a movable wedge for approximating said faces, substantially as and for the purpose set forth.

4. In a feed or carrier, the combination of oscillating levers, impinging faces provided upon said levers, a sliding block for operating said levers, and inclined ways provided upon said block and engaging said levers, substantially as described.

5. In a feed or carrier, the combination of swinging jaws for grasping the article to be fed, a wedge connected to said jaws, and a spring for raising said wedge and approximating said jaws, substantially as and for the purpose set forth.

6. In a feed or carrier, the combination of impinging faces for grasping the article to be fed, a movable wedge connected to said impinging faces, and mechanism for raising and lowering said wedge, whereby said faces are approximated and separated, substantially as and for the purpose specified.

7. In a feed or carrier, the combination of carrier-arms having one extremity movable toward the article to be fed, a sliding block, and inclined ways provided in said block for engaging the opposite extremities of said arms, substantially as and for the purpose specified.

8. In a feed or carrier, the combination of carrier-arms having one extremity movable toward the article to be fed, a sliding block for operating said arms, ways provided in said block and inclined from each other, and a roller provided on said arms for engaging said ways or grooves, substantially as and for the purpose set forth.

9. In a feed or carrier, the combination of carrier-arms, a movable wedge for operating said arms or jaws, a spring for forcing said wedge or block in one direction, and a cam for forcing said wedge in the opposite direction, substantially as described.

10. In a feed or carrier, the combination of carrier-arms, a movable wedge for operating said arms or jaws, a roller provided upon said wedge, a spring for forcing said wedge in one direction, and a cam engaging said roller for forcing the wedge or block in the opposite direction, substantially as set forth.

11. In a feed or carrier, the combination of carrier-arms, impinging faces mounted on said arms, a sliding block for operating said arms, inclined ways or grooves provided in said block and engaging said arms or jaws, a cam mounted above said block for forcing it downward, a cut-out provided in said cam, and mechanism for forcing said block upward when said cut-out is registered therewith, substantially as and for the purpose described.

12. In a feed or carrier, the combination of carrier-arms, impinging faces provided upon said arms for grasping the article to be fed, a sliding block for operating said arms, grooves provided in said block for engaging said arms, and mechanism for reciprocating said block, substantially as specified.

13. In a feed or carrier, the combination of carrier-arms, yielding faces mounted on said arms, a sliding block for operating said arms, inclined ways or grooves provided in said wedge, and mechanism for reciprocating said wedge, substantially as set forth.

14. In a feed or carrier, the combination of a supporting-plate, carrier-arms pivoted to said plate, a movable wedge between said arms for approximating or separating the free extremities thereof, and mechanism, substantially as described, for operating said wedge, substantially as specified.

15. In a feed or carrier, the combination of a supporting-plate, arms oscillatingly mounted upon said plate, a movable wedge for engaging said arm, and mechanism for reciprocating said wedge, substantially as and for the purpose specified.

16. In a feed or carrier, the combination of supporting plates or disks, arms pivotally mounted upon one of said plates, a rod on the other of said plates, a movable wedge guided by said rod, and mechanism for operating the wedge, substantially as and for the purpose described.

17. In a feed or carrier, the combination, with a pair of supporting plates or disks, of carrier-arms pivoted between said plates, a projecting guide-rod secured on one of said plates, a sliding block guided by said rod, inclined ways provided in the block, a spring mounted upon said guide-rod for forcing upward said block, and a cam bearing upon the block for forcing the same downward, substantially as specified.

18. In a feed or carrier, the combination of supporting-disks, carrier-arms pivoted between said disks, a movable wedge for forcing said arms toward and away from each other, and a cut-out in one of said disks to allow the movement of said wedge, substantially as and for the purpose described.

19. In a feed or carrier, the combination of a supporting-disk, carrier-arms pivoted to said disk, a movable wedge for operating said carrier-arms, inclined ways provided in said wedge for engaging the said arms, and a cut-out provided in said disk for allowing the movement of the wedge, substantially as described.

20. In a feed or carrier, the combination of impinging faces for grasping the article to be fed, a movable wedge for operating said faces toward and away from each other, and a guide for bringing said article to the desired plane in relation to said faces, substantially as described.

21. In a feed or carrier, the combination of oscillating carrier-arms, impinging faces mounted upon said arms, a sliding block for operating the arms, inclined ways or grooves provided in said block, and a gage for bringing to the desired plane the article to be fed, substantially as specified.

22. In a feed or carrier, the combination of a fixed gage, a movable frame, impinging faces mounted upon said frame, a sliding block, inclined ways provided in said block, and mechanism for reciprocating the block, substantially as specified.

23. In a feed or carrier, the combination of a gage, carrier arms or levers, impinging faces mounted upon said arms or levers, a sliding block for operating the arms, inclined ways provided in said block, a spring for forcing upward said block to approximate the bearing-faces, and a cam for forcing downward said block to separate said faces, substantially as set forth.

24. In a feed or carrier, the combination, with carrier-arms for grasping the article to be fed and a wedge for operating said arms, of a second set of arms or levers in a different plane from said carrier-arms and mechanism for approximating said second set of arms to the carrier-arms, substantially as set forth.

25. In a feed or carrier, the combination of carrier-arms, a movable wedge for operating said arms, a spring for forcing upward said wedge, and a cam for forcing said wedge downward, with levers or arms mounted in a different plane from said carrier-arms and mechanism for approximating said latter levers to the carrier-arms, substantially as described.

26. In a feed or carrier, the combination of impinging faces for grasping the article to be fed, a movable wedge for approximating said faces toward and away from each other, mechanism for operating said wedge, a rod movable toward said impinging faces, and an auxiliary support mounted upon said rod, substantially as and for the purpose set forth.

27. In a feed or carrier, the combination of carrier-arms, impinging faces mounted upon said arms, a sliding block having inclined ways for operating said carrier-arms, a rod movable toward said carrier-arms, a projection formed or provided upon said rod, a cam for engaging said projection, and an auxiliary support mounted on said rod, substantially as specified.

28. In a feed or carrier, the combination of carrier-arms, a movable wedge for operating said arms, levers mounted in a different plane from the carrier-arms, mechanism for approximating said levers to the carrier-arms, and mechanism, substantially as described, for opening and closing said levers, substantially as described.

29. In a feed or carrier, the combination of carrier-arms, a movable wedge for operating said arms, levers mounted in a different plane from the carrier-arms, mechanism for approximating said levers to the carrier-arms, and a guide for said levers, substantially as described.

30. In a feed or carrier, the combination of carrier-arms for grasping the article to be fed, a rod or support movable toward said carrier-arms, a plate mounted upon said rod, a guide for said plate, levers mounted upon said plate, and mechanism for approximating said rod toward the carrier-arms, substantially as described.

31. In a feed or carrier, the combination of carrier-arms for grasping the article to be fed, a movable wedge for operating said arms, a sleeve or disk mounted above said carrier-arms, slots provided in said disk, a second set of levers movable in said slots, and mechanism for approximating said levers toward the carrier-arms, substantially as specified.

32. In a feed or carrier, the combination of carrier-arms, oscillating arms R R above said carrier-arms, a spring R' for closing said arms, and a cam R² for opening said arms, substantially as and for the purpose specified.

33. In a feed or carrier, the combination of carrier-arms, oscillating arms R R in a different plane from said carrier-arms, a spring R' for closing said arms, a cam R² for opening said arms, and a disk mounted above said arms and provided with projections for engaging said cam, substantially as and for the purpose set forth.

34. In a feed or carrier, the combination, with a gage for bringing to the desired plane the article to be fed, of a yielding support beneath said gage, carrier-arms for grasping said article when brought to its desired position, and a wedge for operating said arms, substantially as and for the purpose set forth.

35. In a feed or carrier, the combination, with a gage for bringing to the desired plane the article to be fed, of a yielding support beneath said gage, carrier-arms for grasping said article when brought to its desired position, a wedge for operating said arms, and an auxiliary support in a plane above that of the carrier-arms, substantially as described.

36. In a feed or carrier, the combination of a movable supporting-frame, carrier-arms arranged in pairs and supported by said frame, wedges supported by said frame and connected to operate said arms, and a fixed cam for actuating said wedges as said frame is moved, substantially as set forth.

37. In a feed or carrier, the combination of a movable supporting-frame, carrier-arms arranged in pairs and supported by said frame, wedges supported by said frame and connected to operate said arms, a cam for actuating said wedges as said frame is moved, and a gage for bringing to the desired plane the article to be grasped by said carrier-arms, substantially as set forth.

38. In a feed or carrier, the combination of a movable supporting-frame, carrier-arms arranged in pairs and supported by said frame, wedges supported by said frame and connected to operate said arms, a cam for actuating said wedges as said frame is moved, a second set of arms or levers in a different plane from that of said carrier-arms and supported by said frame, and mechanism for approximating said second set of arms to the carrier-arms, substantially as described.

39. In a feed or carrier, the combination of a movable supporting-frame, carrier-arms arranged in pairs and supported by said frame, wedges supported by said frame and connected to operate said arms, means, substantially as described, for actuating said wedges as said frame is moved, a second set of arms or levers in a different plane from that of said carrier-arms and supported by said frame, mechanism for approximating said second set of arms to the carrier-arms, and mechanism, substantially as described, for opening and closing said second set of levers, substantially as described.

40. In a feed or carrier, the combination of a movable supporting-frame, carrier-arms arranged in pairs and supported by said frame, wedges supported by said frame and connected to operate said arms, a cam for actuating said wedges as said frame is moved, and mechanism, substantially as described, for intermittently actuating said supporting-frame, substantially as and for the purpose set forth.

41. In a feed or carrier, the combination of a movable supporting-frame, carrier-arms arranged in pairs and supported by said frame, wedges supported by said frame and connected to operate said arms, a cam for actuating said wedges as said frame is moved, a second set of arms or levers in a different plane from that of said carrier-arms and supported by said frame, mechanism for approximating said second set of arms to the carrier-arms, mechanism, substantially as described, for opening and closing said second set of levers, and mechanism, substantially as described, for intermittently actuating said supporting-frame, substantially as and for the purpose set forth.

42. In a feed or carrier, the combination of a movable supporting-frame, carrier-arms arranged in pairs and supported by said frame, wedges supported by said frame and connected to operate said arms with the following mechanisms, to wit: for actuating said wedges as said frame is moved for intermittently actuating said supporting-frame and for intermittently locking said supporting-frame from movement, substantially as and for the purpose specified.

43. In a feed or carrier, the combination of a movable supporting-frame, carrier-arms arranged in pairs and supported by said frame, wedges supported by said frame and connected to operate said arms, means, substantially as described, for actuating said wedges as said frame is moved, a second set of arms or levers in a different plane from that of said carrier-arms and supported by said frame, and mechanism for approximating said second set of arms to the carrier-arms with the following mechanisms, to wit: for opening and closing said second set of levers, for approximating said second set of arms to the carrier-arms, for intermittently actuating said supporting-frame, and for intermittently locking said supporting-frame from movement, substantially as described.

44. In a feed or carrier, the combination of a movable supporting-frame, carrier-arms arranged in pairs and supported by said frame, wedges supported by said frame and connected to operate said arms, means, substantially as described, for actuating said wedges as said frame is moved, and a support N beneath said carrier-arms, substantially as and for the purpose set forth.

45. In a feed or carrier, the combination of a movable supporting-frame, carrier-arms arranged in pairs and supported by said frame, wedges supported by said frame and connected to operate said arms, means, substantially as described, for actuating said wedges as said frame is moved, a support N beneath said carrier-arms, and mechanism for intermittently rotating said supporting-frame for the carrier-arms and consecutively registering the separate pairs of arms with said support, substantially as and for the purpose set forth.

46. In a feed or carrier, the combination of a movable supporting-frame, carrier-arms arranged in pairs and supported by said frame, wedges supported by said frame and connected to operate said arms, means, substantially as described, for actuating said wedges as said frame is moved, and a support N beneath said carrier-arms, with the following mechanisms, to wit: for intermittently rotating said supporting-frame for the carrier-arms and consecutively registering the separate pairs of arms with said support and for reciprocating said support N toward the carrier-arms, substantially as and for the purpose described.

47. In a feed or carrier, the combination of a movable supporting-frame, carrier-arms arranged in pairs and supported by said frame, wedges supported by said frame and connected to operate said arms, means, substantially as described, for actuating said wedges as said frame is moved, a support N beneath said carrier-arms, and the following mechanisms, to wit: for intermittently rotating said supporting-frame for the carrier-arms and consecutively registering the separate pairs of arms with said support, for reciprocating said support N toward the carrier-arms, and for locking said supporting-frame in said position, substantially as and for the purpose described.

In testimony whereof we have hereunto signed our names, in the presence of two attesting witnesses, at Rochester, in the county of Monroe, in the State of New York, this 10th day of September, 1889.

HENRY LA CASSE.
SOL. WILE.

Witnesses:
H. E. PARSONS,
FRANK M. GOFF.